United States Patent
Maruyama et al.

(10) Patent No.: US 6,202,086 B1
(45) Date of Patent: *Mar. 13, 2001

(54) MESSAGE STORE AND FORWARD SYSTEM

(75) Inventors: Tomoaki Maruyama, Yokohama; Yasuki Iizuka, Tokyo, both of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/966,125

(22) Filed: Nov. 7, 1997

(30) Foreign Application Priority Data

Nov. 12, 1996 (JP) .................................. 8-300011

(51) Int. Cl.⁷ ...................................... G06F 13/00
(52) U.S. Cl. .......................... 709/206; 709/207; 709/249; 709/208; 379/88.1; 358/434; 358/468; 370/352
(58) Field of Search ..................................... 709/206, 249, 709/207, 208; 379/88.01; 358/434, 468; 370/352

(56) References Cited

U.S. PATENT DOCUMENTS

| 5,193,110 | | 3/1993 | Jones et al. | 379/94 |
| 5,333,266 | * | 7/1994 | Boaz et al. | 709/206 |
| 5,608,786 | * | 3/1997 | Gordon | 370/352 |
| 5,675,507 | * | 10/1997 | Bobo, II | 364/514 |
| 5,844,691 | * | 12/1998 | Nishiyama et al. | 358/434 |

* cited by examiner

*Primary Examiner*—Glenton B. Burgess
*Assistant Examiner*—Hieu C. Le
(74) *Attorney, Agent, or Firm*—Israel Gopstein (57) ABSTRACT

A plurality of boxes are provided in a memory region of the system. Each message is registered and stored in a designated box and fetched from this box. Each box is owned by a user so that a message addressed to this user is stored in his/her box. Predetermined preprocessing and/or postprocessing are executed before and after the message is registered into or fetched from the designated box.

4 Claims, 9 Drawing Sheets

USER INFORMATION TABLE 400

| ID | NAME | COMMUNICATION ADDRESSES |
|---|---|---|
| uid 1 | USER 1 | E-MAIL : USER 1 @ adc<br>FACSIMILE : 03-123-4567<br>PAGER : 03-222-3333 |
| uid 2 | USER 2 | E-MAIL : user 2 @ adc<br>FACSIMILE : 03-123-9876<br>PAGER : 03-222-3344 |

BOX INFORMATION TABLE 401

| ID | OWNER |
|---|---|
| box 1 | uid 1 |
| box 2 | uid 2 |

REGISTRATION PREPROCESSING 200

1 DELETE MESSAGE STORED IN A BOX

REGISTRATION POSTPROCESSING 800

1 SEND RECEIPT NOTICE TO BOX OWNER'S FACSIMILE

2 SEND RECEIPT NOTICE TO BOX'S OWNER PAGER

FETCH PREPROCESSING 202

1 SEND STORED MESSAGE WHEN ADMINISTRATOR'S REQUEST IS RECEIVED

FETCH POSTPROCESSING 203

1 SEND FETCH NOTICE TO MESSAGE PROVIDER

FIG. 9

```
TO : SYSTEM @ abc
FROM : USER 1 @ abc

EXECUTE :

{ SEND BOX 1'S MESSAGE TO FAX 03-123-4567 }
```
900

```
<TO> SYSTEM @ abc
<FROM> USER 1 @ abc

<COMMAND>
EXECUTE :

{ SEND BOX 1'S MESSAGE TO FAX 03-123-4567 }
```
901

FIG. 10

DATA CONVERSION TABLE 1000

| ORIGINAL DATA FORMAT | TARGET DATA FORMAT | CONVERSION MEANS |
|---|---|---|
| text / jis | image / tiff-f | Txt2Tif |
| text / jis | image / jpeg | Txt2Jpg |
| image / tiff-f | image / jpeg | Tif2Jpg |
| image / jpeg | image / tiff-f | Jpg2Tif |
| text / jis | audio / ulaw | Txt2Ulaw |

FIG. 11

TERMINAL DATA FORMAT TABLE 1100

FIG. 12

MESSAGE STORE AND FORWARD SYSTEM

BACKGROUND OF THE INVENTION

1. Field of the Invention

The present invention relates to a message store and forward system, such as an E-mail switching system, a computer-based telephony system or a facsimile store-and-forward system, having various functions of delivering or forwarding messages, deleting messages and converting data formats of messages.

2. Prior Art

A recent computer-based telephony server allows mutual message exchanges between I/O devices of E-mail (i.e., computers) and other information terminals, such as facsimile terminals and telephones. This kind of conventional message store and forward system uses a simple protocol conversion device to connect I/O devices of different information terminals for realizing the message exchange. However, functions actually realized by this conventional message store and forward system are limited and dissatisfactory.

SUMMARY OF THE INVENTION

A principal object of the present invention is to realize fine and flexible operations of the message store and forward system.

In order to accomplish the above-described and other related objects, the present invention provides at least one box in a memory region of the system. Each message is registered and stored in a designated box and fetched from this box. Each box is owned by a user. A message addressed to this user is stored in his/her box.

According to the present invention, a message is stored in a message storage means (i.e., box). Before and after the message is processed for the message storage means, predetermined preprocessing and/or postprocessing are executed.

More specifically, a first aspect of the present invention provides a message store and forward apparatus comprising a box storing a message, message registration means for registering the message into the box, and processing procedure execution means for executing predetermined preprocessing before the message is registered in the box and executing predetermined postprocessing after the message is registered in the box.

A second aspect of the present invention provides a message store and forward apparatus comprising a box storing a message, message fetch means for fetching the message from the box, and processing procedure execution means for executing predetermined preprocessing before the message is fetched from the box and executing predetermined postprocessing after the message is fetched from the box.

A third aspect of the present invention provides a message store and forward apparatus wherein the preprocessing or the postprocessing for the message registration or fetch operation is edited by sending an edit message including content of an editing operation to the processing procedure execution means.

A fourth aspect of the present invention provides a message store and forward apparatus comprising means for processing programming languages, means for registering program content described by the programming languages as a message, and means for processing and executing the registered content as a program.

A fifth aspect of the present invention provides a message store and forward apparatus comprising a box storing a message, message fetch means for fetching the message from the box, format conversion means for converting data format of the fetched message, wherein a desirable data format is selected when the message is fetched.

A sixth aspect of the present invention provides a message store and forward apparatus comprising message storage means for storing a message, message fetch means for fetching the message from the message storage means, format conversion means for converting data format of the fetched message, and a terminal data format table listing data formats processible in each of a plurality of information terminals, wherein a desirable information terminal is designated with reference to the terminal data format table when the message is fetched.

A seventh aspect of the present invention provides a message store and forward apparatus comprising means for registering a message, means for memorizing a related information terminal in connection with the registered message, means for sending a notice relating to the registered message via an information terminal identical in type with the memorized information terminal.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Preferred embodiments of the present invention will be explained in more detail with reference to the accompanied drawings. Identical parts are denoted by the same reference numerals throughout the views.

First Embodiment

A first embodiment of the present invention relates to message registration and will be explained with reference to FIGS. 1 to 5.

Figure 1:
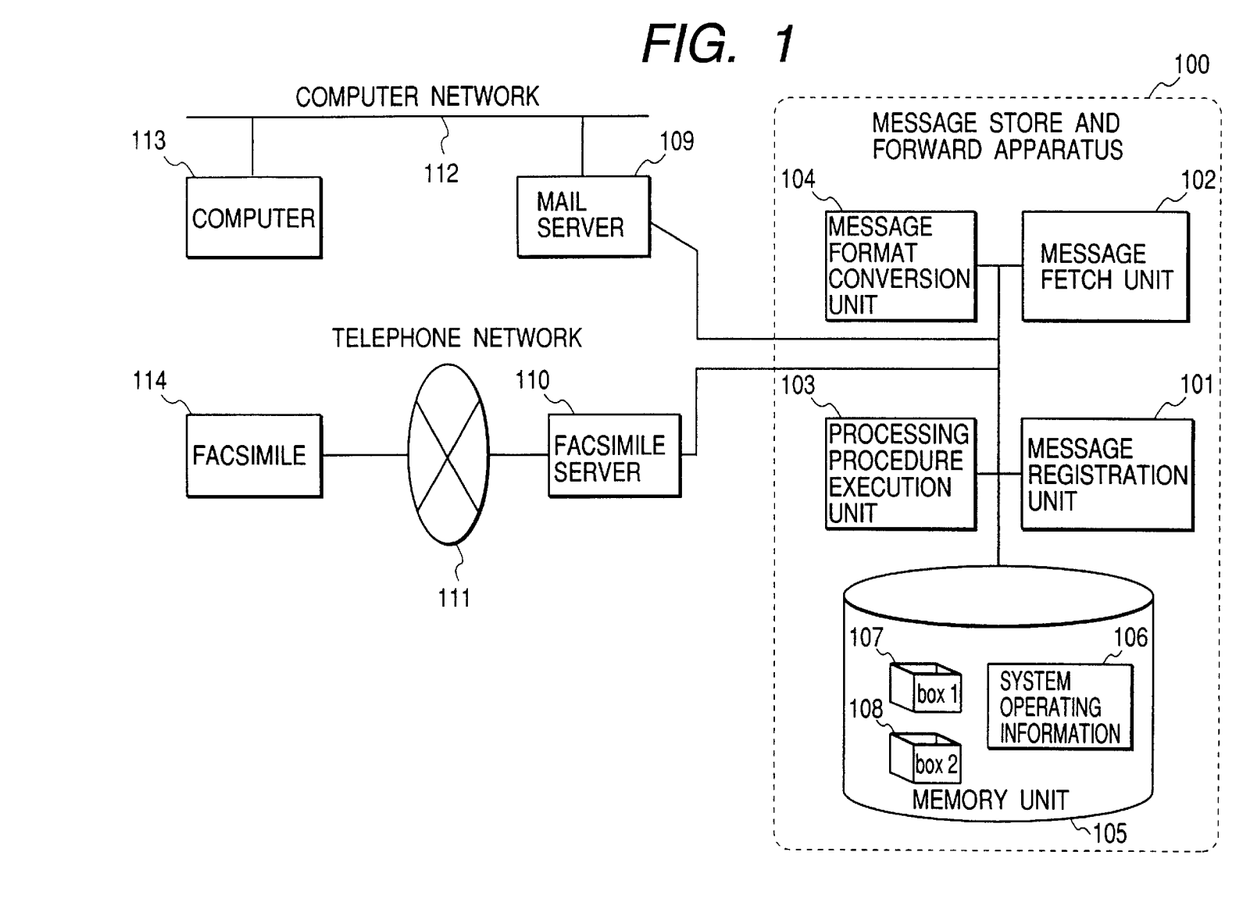
FIG. 1 is a schematic view showing an arrangement of a message store and forward system in accordance with first, second, fifth, sixth and seventh embodiments of the present invention.

FIG. 1 is a schematic view showing an arrangement of a message store and forward system and connection to external terminals. A message store and forward apparatus 100 comprises a message registration unit 101, a message fetch unit 102, a processing procedure execution unit 103, a message format conversion unit 104 and a general memory unit 105.

The message store and forward apparatus 100 is connected to existent information switching systems of single terminal type, such as a mail server 109 and a facsimile server 110. Messages are exchangeable between the connected information systems.

When a message is entered by a user through an appropriate terminal, the message registration unit 101 assigns an ID (identification) data to the entered message and memorizes the identified message at a designated memory region. According to the present invention, the overall memory region for the messages are divided into a plurality of regions. Each of the dissected memory regions is referred to as "box." Each box has a box ID as a unique name and defines a user owning this box. Furthermore, each box has another memory region which memorizes descriptive programs used for executing a total of four subsidiary processes: message registration preprocessing; message registration postprocessing; message fetch preprocessing; and message fetch postprocessing.

When a user name or a specific box is designated by the user through an appropriate terminal, the message fetch unit 102 fetches the message from the user's box or from the designated box. Then, the fetched message is sent to the user's terminal.

The processing procedure execution unit 103 acts as an interpreter apparatus for interpreting the content of the programs of the above-described four processing memorized in the box.

When the message store and forward apparatus 100 receives a message, the message format conversion unit 104 converts the format of the entered message into a predetermined message format processible or valid in the message store and forward apparatus 100. Furthermore, when a message is sent from the message store and forward apparatus 100 to an external information system such as a mail server or a facsimile server, the message format conversion unit 104 reconverts the format of the stored message into the original or a designated message format processible or valid in the designated external information system.

Both of the mail server 109 and the facsimile server 110 are existent devices connected to the message store and forward apparatus 100 for performing predetermined input-and-output operations. The mail server 109 is connected to a computer 113 via a computer network 112. The facsimile server 110 is connected to a facsimile terminal 114 via an existent telephone network 111.

The computer network 112 guarantees the delivering or forwarding of E-mails between the computer 113 and the mail server 109. In this respect, the computer network 112 of this embodiment comprises a commercially available wide area network, such as the Internet, or a local area network (i.e., LAN).

The telephone network 111 guarantees communications between the facsimile terminal 114 and the facsimile server 110. In this respect, the telephone network 111 of this embodiment comprises a public telephone network and a private telephone network, such as extension lines.

Although this embodiment only discloses the computer 113 and the facsimile terminal 114, it is needless to say that whatever terminals having the capability of reading and writing E-mails can be connected to the message store and forward apparatus 100.

The general memory unit 105 has a memory region for a first box 107 having an ID number of "box 1" and another memory region for a second box 108 having an ID number of "box 2." The general memory unit 105 further comprises a memory region for various system operating information 106 used when the message store and forward apparatus 100 is operated.

Figure 2:
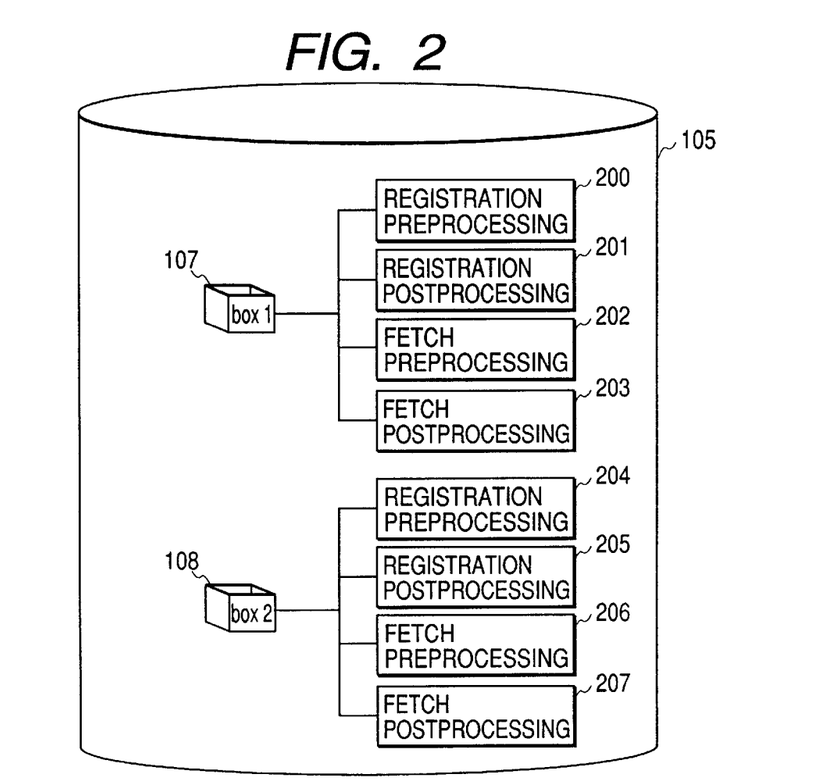
FIG. 2 is a schematic view showing the arrangement of message boxes provided in the message store and forward system in accordance with the embodiments of the present invention.

FIG. 2 is an enlarged view showing detailed construction of the first and second boxes 107 and 108. The first box 107 is associated with additional memory regions for storing the program of four subsidiary processes: message registration preprocessing 200, message registration postprocessing 201; message fetch preprocessing 202; and message fetch postprocessing 203. The second box 108 is associated with additional memory regions for storing the program of four subsidiary processes: message registration preprocessing 204, message registration postprocessing 205; message fetch preprocessing 206; and message fetch postprocessing 207.

Figure 3:
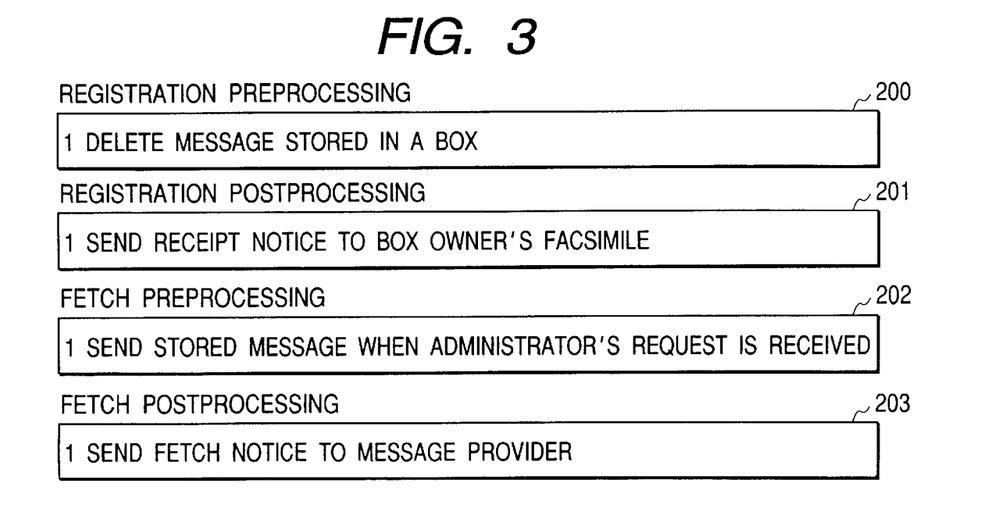
FIG. 3 is a schematic view simply showing the program stored in the processing group shown in FIG. 2.

FIG. 3 shows detailed contents of the subsidiary processing 200 through subsidiary processing 203. Content of each subsidiary processing is described by artificial programming languages that the processing procedure execution unit 103 can interpret and execute.

Figure 4:
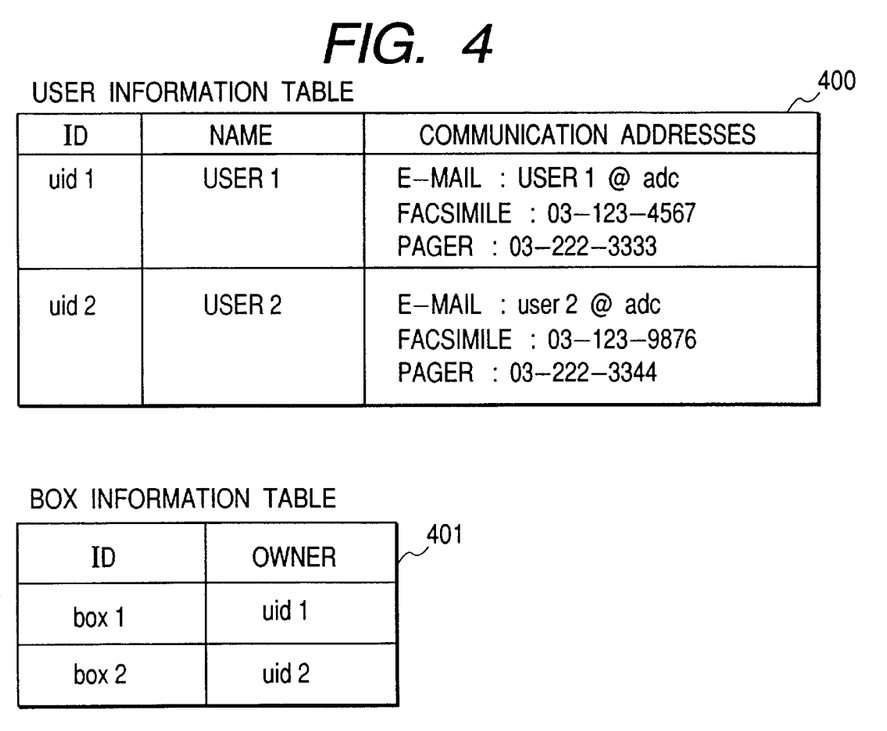
FIG. 4 is a schematic view showing tables referred to as system operating information in the present invention.

FIG. 4 shows details of the system operating information 106. More specifically, the system operating information 106 comprises two tables; a user information table 400 and a box information table 401.

Figure 5:
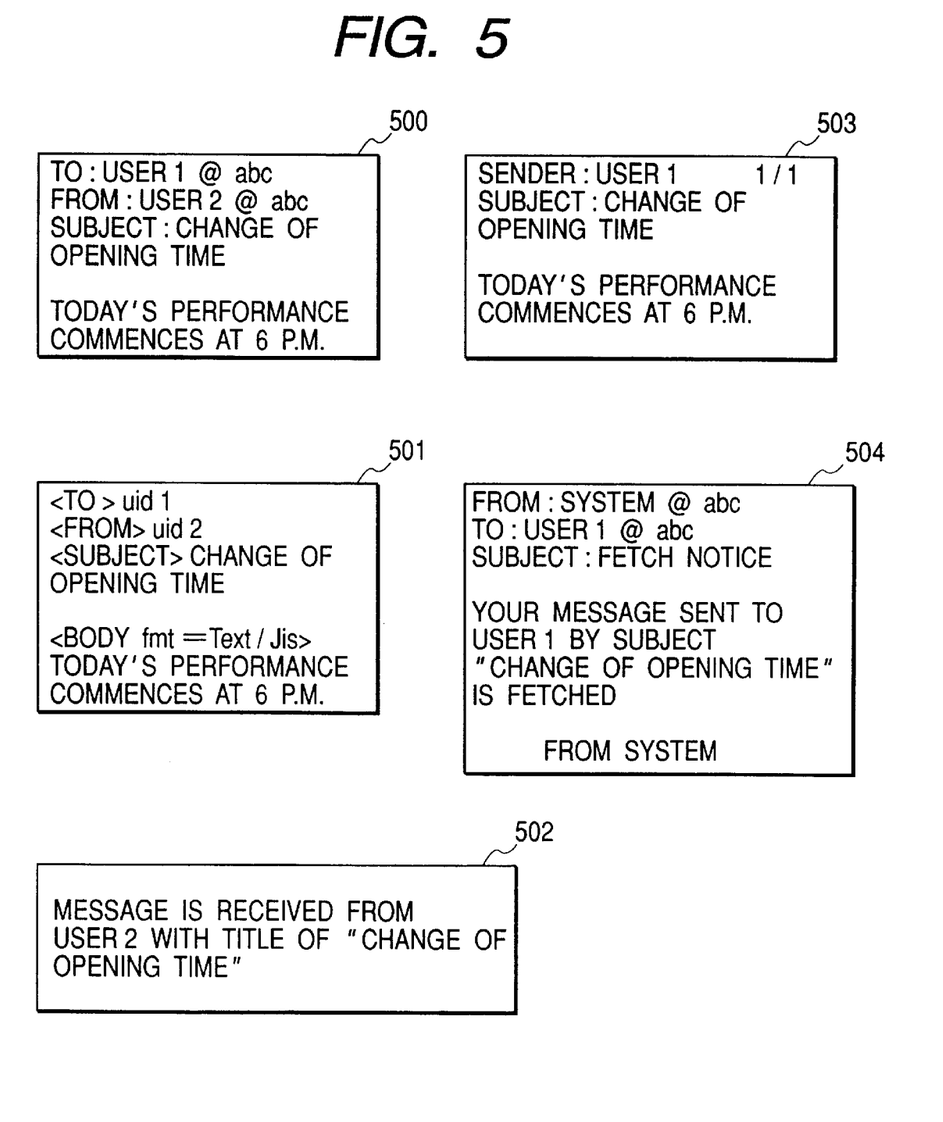
FIG. 5 is a schematic view showing messages used in the first, second, sixth and seventh embodiments of the present invention.

FIG. 5 is a view showing detailed contents of messages used in this embodiment.

Hereinafter, an operation of the above-described first embodiment of the present invention will be explained. For example, in the message store and forward system, a message is registered as an E-mail and a receipt notice of this message is sent to the facsimile.

FIG. 5 shows an E-mail message 500 sent from one user, named "user 2," to another user, named "user 1." E-mail message 500 schematically expresses the content of E-mail. The mail server 109, when receiving an E-mail, transfers or forwards the received mail to the message store and forward apparatus 100. Then, E-mail message 500 is sent to the message registration unit 101.

The message registration unit 101, when received the E-mail message 500 from the mail server 109, calls the message format conversion unit 104 to change the data format of the E-mail message 500. More specifically, the message format conversion unit 104 converts the message format of the E-mail 500 into an appropriate message format processible or valid in the message store and forward apparatus 100. In the process of this format conversion, not only conversion of syntax but also conversion of semantics are performed. More specifically, sender and receiver addresses written in the E-mail 500 are automatically converted into user ID data processing in the message store and forward apparatus 100. For example, the sender name "user 1@abc" is changed to "uid1" as shown in a format-converted message 501.

The message format conversion unit 104 retrieves the "communication addresses" of the user information table 400 stored in the system operating information 106 to find a corresponding address ID "uid1" meeting "user1@abc." The message 501 shows the resultant content obtained through the above-described conversion of the message format including the conversion of addresses.

Next, the message registration unit 101 stores the message 501 in a designated or appropriate box that is usually owned by the user addressed in the message 501. By retrieving the box information table 401, "box 1" is found as a box belonging to the user 1 (i.e. uid1).

Next, the message registration unit 101 goes on to a registering operation of the message 501 into the first box 107 having ID data of "box 1." However, according to the embodiment of the present invention, the first box 107 is accompanied with the program of message registration preprocessing 200. The content of message registration preprocessing 200 is executed immediately before the message 501 is registered into the first box 107. The detailed content of the message registration preprocessing 200 is "delete the message in a box (i.e., box 107)" as shown in FIG. 3. The processing procedure execution unit 103 interprets and executes the content of the message registration preprocessing 200.

Through the message registration preprocessing 200, all of the stored message in the first box 107 is entirely erased each time a new message is registered. In other words, the registration operation performed by the message registration unit 101 looks like an overwriting operation which replaces the existing message with a newly registered message.

After finishing the deletion of the existing message, the message 501 is stored in the first box 107. Upon completion of the storing of message 501, the message registration postprocessing 201 is interpreted and executed.

The detailed content of the message registration postprocessing 201 is "send receipt notice to box owner's facsimile" as shown in FIG. 3. The processing procedure execution unit 103 interprets and executes the content of the message registration postprocessing 201. Thus, a facsimile letter is sent to the facsimile of user 1, owner of first box 107, to notify that the message 501 is stored in the first box 107.

According to the user information table 400, a facsimile number of user 1 is 03-123-4567. The processing procedure execution unit 103 creates a facsimile text shown by a message 502 and then transmits it to the designated facsimile of 03-123-4567.

An actual transmitting operation is performed by the facsimile server 110, so that the message 502 is finally sent to the intended facsimile (e.g., facsimile terminal 114 if having the facsimile number of 03-123-4567). Thus, the user 1 can know the arrival of a new message sent to his/her box 107.

According to the above-described embodiment, the receipt notice can be sent to other information terminals, such as a telephone, a pager, PHS (i.e., personal handy phone) and a set top box, in the same manner as to the facsimile.

The user 1, after receiving the receipt notice, is allowed to fetch the received message 501 via the facsimile or via the E-mail.

As described above, each box is associated with the subsidiary program of the message registration preprocessing and the message registration postprocessing which are executed before and after the registration of a new message.

In other words, various processing relating to a message can be executed independently in each box.

Detailed contents of the message registration preprocessing and the message registration postprocessing can be easily changed by using operation administration tools.

Second Embodiment

A second embodiment of the present invention will be explained with reference to FIGS. 1 to 5. Explanation for FIGS. 1 to 5 is omitted here since it is substantially described in the first embodiment.

The second embodiment relates to a message fetch operation. For example, when the message 501 is stored in the first box 107, the user 1 may want to fetch the message 501 from the first box 107. In such a case, both the message fetch preprocessing and the message fetch postprocessing are performed in accordance with the second embodiment and its detailed operation will be explained hereinafter.

In this case, "fetch" operation is to send the stored message to a designated terminal without erasing the stored message from the memory device of the message store and forward apparatus.

Retuning to the explanation of the operation of the second embodiment, it is assumed that the message 501 is already stored in the first box 107 according to the processing shown in the first embodiment. The user 1 now intends to get the content of first box 107 via his/her facsimile terminal 114.

More specifically, the user 1 tries to fetch the stored content from the first box 107 according to a typical box fetch procedure for the existing facsimile store and forward apparatus. For example, the user 1 of the facsimile terminal 114 dials the facsimile server 110. The facsimile server 110 provides a voice guidance, according to which a command is transmitted from the facsimile terminal 114 to the facsimile server 110. For example, the command, such as "send the stored message from the box (107) to the facsimile (114)," is sent by DTMF signals.

Based on this command, the facsimile server 110 sends a request to the message fetch unit 102 for fetching the message stored in the first box 107.

In response to the request, the message fetch unit 102 retrieves the first box 107 to find the message 501. Then, a fetching operation is commenced.

First, the processing procedure execution unit 103 interprets and processes the message fetch preprocessing 202 associated with the first box 107. The detailed content of the message fetch preprocessing 202 is "send the stored message when administrator's request is received" as shown in FIG. 3. Thus, the message stored in the first box 107 is sent to the facsimile terminal 114 in response to the request.

After the processing procedure execution unit 103 accomplished the interpretation and execution of message fetch preprocessing 202, the message fetch unit 102 asks the message format conversion unit 104 to change the data format. More specifically, the message format conversion unit 104 converts the message format of the message 501 into a message format processible or valid in the facsimile server 110.

A message 503 shown in FIG. 5 is a facsimile image obtainable as a result of the above-described format conversion. This facsimile image (i.e., message 503) is sent to the facsimile server 110 and finally output from the facsimile termal 114.

The message fetch unit 102, after confirming successful fetch operation of the message 503 to the facsimile terminal 114, goes on to the message fetch postprocessing 203 associated with the first box 107. The processing procedure execution unit 103 interprets and processes the content of the message fetch postprocessing 203. The detailed content of the message fetch postprocessing 203 is "send fetch notice to a message provider" as shown in FIG. 3. In this case, the sender of the fetched message 501 is "uid2." To send the fetch notice by E-mail, it is confirmed that the E-mail address of "uid2" is "user2@abc" according to the user information table 400.

Thus, E-mail message 504 is created as shown in FIG. 5. The resultant E-mail message 504 is forwarded to the user 2 via the mail server 109. Finally, the user 2 can read the E-mail message 504.

As described above, each box is associated with the message fetch preprocessing and the message fetch postprocessing which are executed before and after the fetch operation of a stored message. In other words, various processing relating to a message can be executed independently in each box.

Detailed contents of the message fetch preprocessing and the message fetch postprocessing can be easily changed by using the operation administration tools.

The present invention has the capability of employing various processing procedures other than the above-described processing procedures. The system of the present invention sufficiently utilizes the functions of a general programming language processing system, ranging from the description of variable declarations or programming control structures to the file I/O or character train operation.

For example, the present invention simply realizes a "notice from administrator" mode. To this end, box message fetch processing with respect to a box"A" is provided as registration postprocessing or fetch preprocessing. And, the box "A" stores various notices sent from the system administrator.

Furthermore, it is preferable to combine this box message fetch processing with the message write processing. For example, "present weather" information can be obtained from an appropriate external data base and stored as a message in the box "A" by using the message write processing. Users can get the weather message from the box "A" by using the box message fetch processing. In this case, the weather information of the box "A" can be erased after the message is sent to the user.

The present invention performs message ID identified E-mail fetch processing, obtaining effects similar to those of the previously described box E-mail fetch processing.

The present invention performs box message list fetch processing that allows the users to get a list of sender and title information stored in the designated box. For example, the box message list fetch processing is set as message fetch preprocessing. The message list serves as an index when taken out together with the message from a certain box.

The present invention performs box create processing that allows the users to create a desirable box having arbitrary attributes according to their preferences. For example, the box create processing is set as message registration postprocessing combined with the message transmission. This makes it possible to create a box having a name representing the receipt date of a message when this message is received. Thus, the received message is stored in the created box.

The present invention performs box delete processing that allows the users to delete the designated box. For example, the box delete processing is set as message fetch postprocessing. This makes it possible to delete the box after the message is read.

The present invention performs box information acquire processing that allows the users to read the attributions (e.g., name and owner) of the designated box. It is effective to combine the box information acquire processing with other command. For example, it becomes possible to attach a box message list only when the box's owner takes out the message.

The present invention performs box attribution renewal processing that allows the users to renew the box attributions including the box' name, owner, registration and/or fetch allowance rights, and message reservation term. This makes it possible to cancel the allowance for the registration when the number of stored messages exceeds an upper limit.

The present invention performs box list fetch processing that allows the users to take out a list of the box attributions held by the system. For example, the box list fetch processing is provided as message fetch preprocessing for the box "A" so that the user can get the list of the box.

The present invention performs various processing procedures relating to the users, such as registration or deletion of user and change of password or user attributions, which are set as registration postprocessing. This makes it possible to administrate and process user's information by using an external message.

The present invention performs user information acquiring processing that allows the users to get user attributions including user's name and address. For example, the user information acquiring processing is set as message fetch postprocessing. This makes it possible to take out the sender information together with the message itself.

The present invention performs user list acquiring processing that allows the users to get a list of names of all or part of users. For example, the user list acquiring processing is set as message fetch preprocessing for the box "A" so that the box "A" can be used as a user list box.

The present invention performs message copy processing that is set as message registration postprocessing. This makes it possible to perform an automatic backup operation by copying the registered message to an appropriate place.

As described above, the present invention performs precise and flexible processing for each box.

Third Embodiment

A third embodiment of the present invention will be explained with reference to FIGS. 2–4 and 6–8. Explanation for FIGS. 2 and 4 is omitted here since it is substantially described in the first embodiment.

Figure 6:
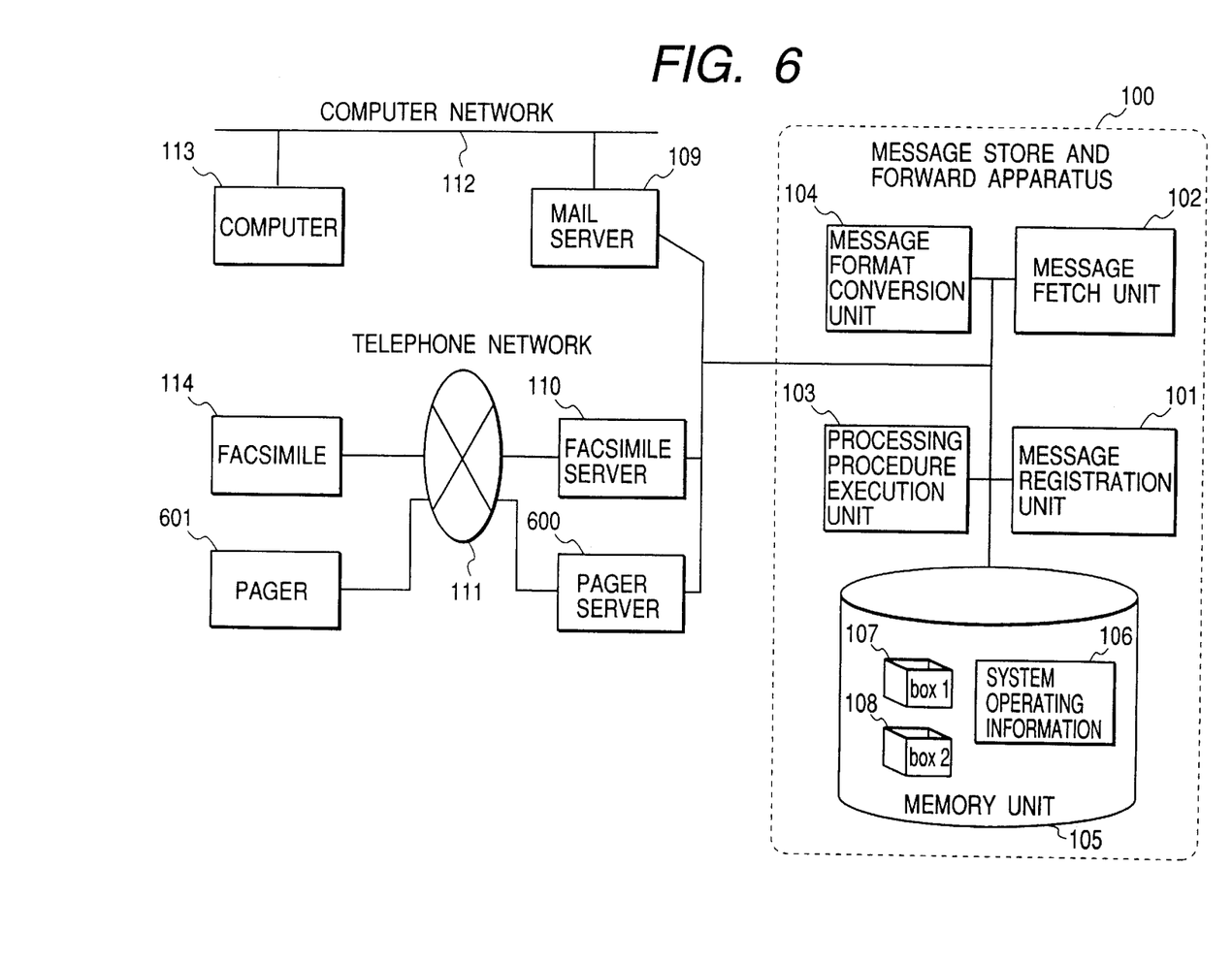
FIG. 6 is a schematic view showing an arrangement of a message store and forward system in accordance with third and fourth embodiments of the present invention.

FIG. 6 is a schematic view showing an arrangement of a message store and forward system in accordance with a third embodiment, which is different from FIG. 1 in that a pager server 600 and a pager 601 are added. The pager server 600, when receiving an instruction from the message store and forward apparatus 100, calls a designated telephone number, then sends designated DTMT signals, and finally disconnects the telephone line. In other words, the pager server 600 is not a device providing the pager service itself. The pager 601 is owned by the user 1.

Figure 7:
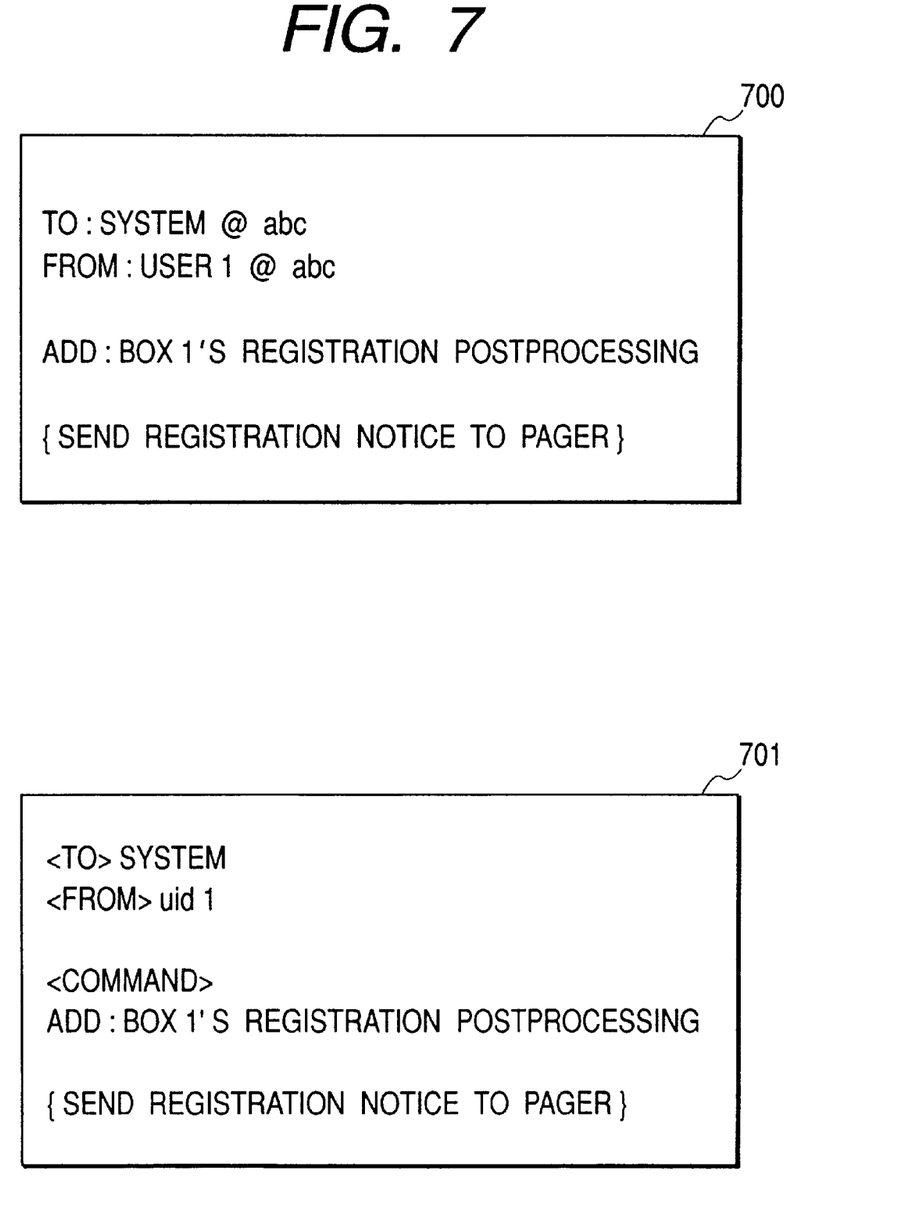
FIG. 7 is a schematic view showing messages used in the third embodiment of the present invention.

In FIG. 7, a message 700 shows a special message used when pager processing is added to the above-described E-mail type message registration postprocessing. This message 700 is converted by the message format conversion unit 104 into a message 701 processible in the system.

Figure 8:
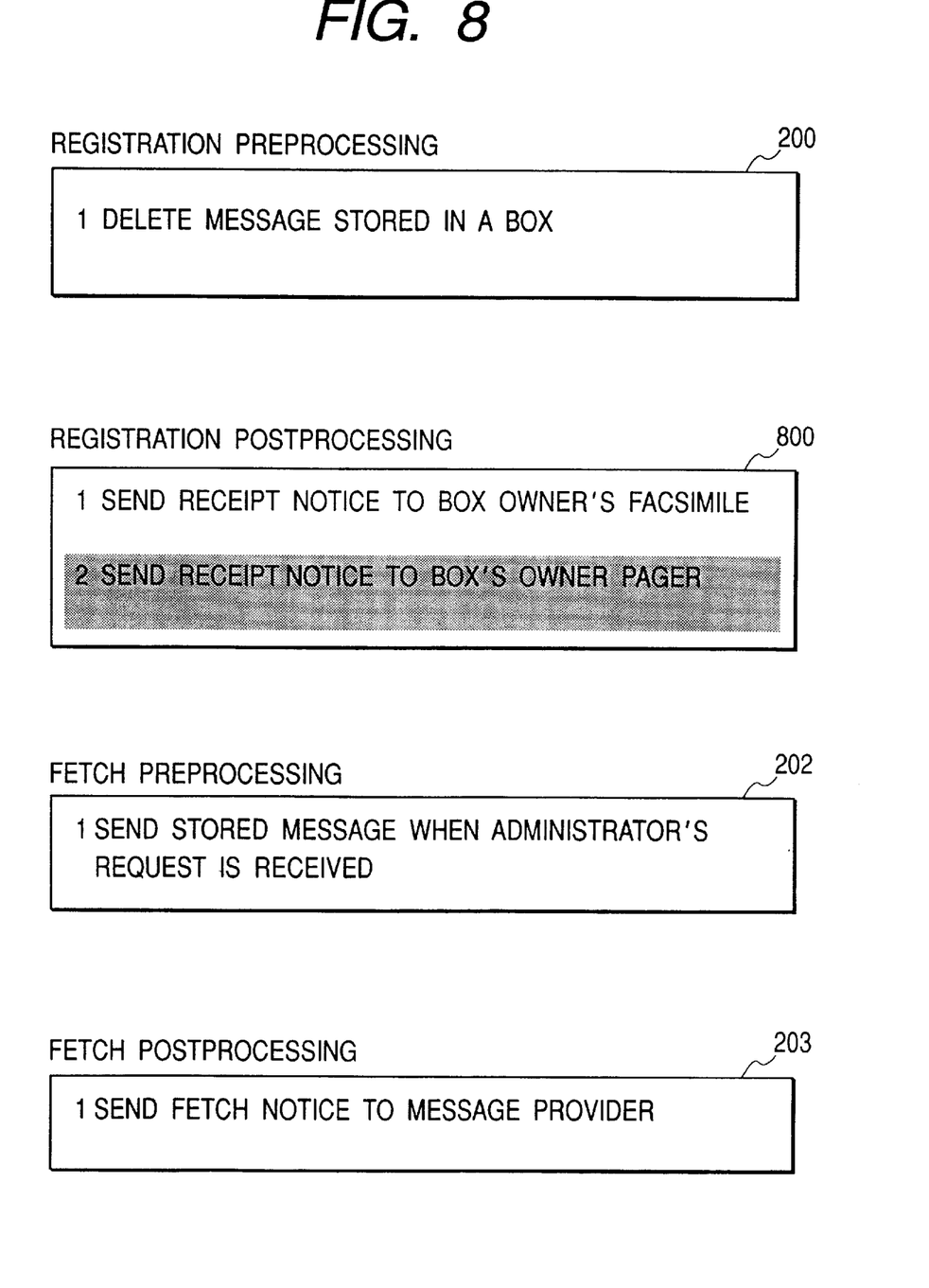
FIG. 8 is a schematic view showing program stored in the processing group associated with a message box in the third embodiment of the present invention.

FIG. 8 shows a schematic view showing a result of addition of the message 700 to the program of the processing group shown in FIG. 3. The newly created processing 800 comprises a shadowed portion that indicates a newly added processing for the pager 601.

The third embodiment will be explained with reference to an operation that the message registration postprocessing 201 is rewritten based on the message 700.

As explained in the first embodiment, the content of the message registration preprocessing and the message registration postprocessing is described by using programming languages. Accordingly, performing the rewriting operation of rewriting the content of the message registration preprocessing by a message requires a special message format. In operation, the message registration apparatus can respond to this special message format.

It is now assumed that the message registration unit 101 received a message addressed to "system" who is a special user. The content of this message is interpreted and executed as a rewriting order of modifying the program for the registration preprocessing or else. An ordinary registration is not performed in this case.

Now, E-mail message 700 shown in FIG. 7 is entered into the message store and forward apparatus 100. The message format conversion unit 104 converts the E-mail message 700 into the message 701 processible in the message store and forward apparatus 100. In this case, the E-mail address "system@abc" is converted as a special address into system ID "system" without retrieving the user information table 400.

The message registration unit 101 cancels the ordinary registration processing when the received message 701 is addressed to "system" who is not an ordinary user. Instead, the content of message 701 is forwarded to the processing procedure execution unit 103 to interpret and execute it.

Detailed content of the message 701 is "add box1's registration postprocessing", according to which the message registration postprocessing for the first box 107 is modified as shown by 800 of FIG. 8. The shadowed portion of the registration postprocessing 800 is added according to the interpretation and execution of the message 701.

The registration postprocessing 800 is described by programming languages.

As apparent from the foregoing, the third embodiment of the present invention determines the special message format. When a special format message is entered in the system, the content of this message is interpreted and executed as an order. This makes it possible to easily modify the program of the processing group including the message registration preprocessing and others.

The third embodiment handles "addition" as an order. However, the present invention can be easily applicable to general programming operations including modification, deletion and reference. For example, "reference" is an order to send back a message containing the program content of the processing group. Accordingly, it becomes possible to modify the content of the processing group including the registration preprocessing and others from a remote place by sending a message. For example, a receiver can be simply set or an address of receipt notice can be simply changed.

Fourth Embodiment

A fourth embodiment of the present invention will be explained with reference to FIGS. 2–4, 6 and 9. Explanation for FIGS. 2–4 and 6 is omitted here since it is substantially described in the third embodiment.

Figure 9:
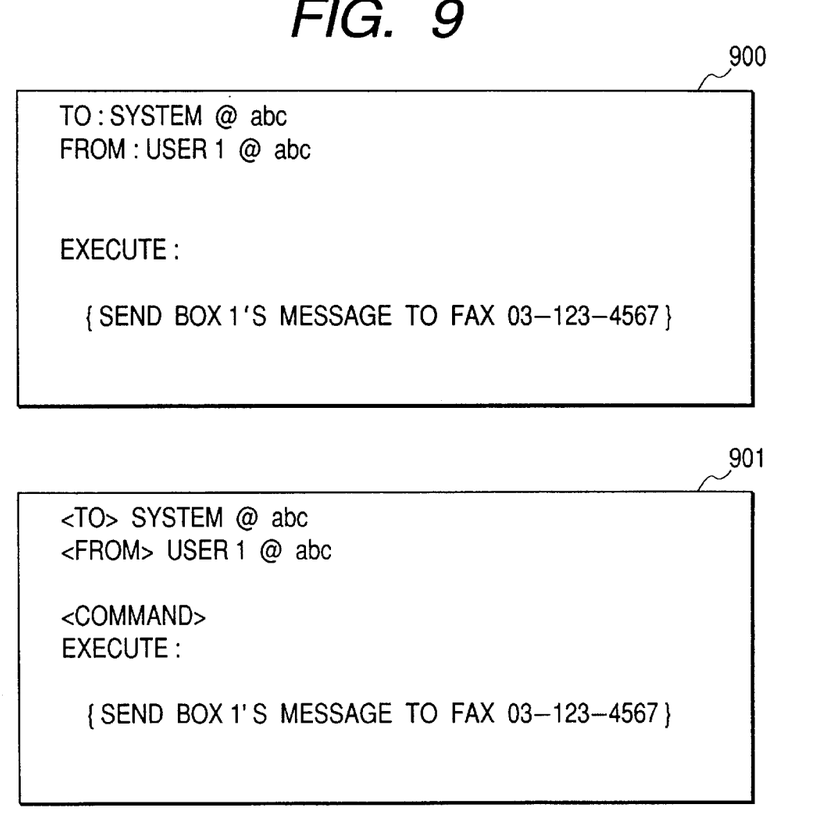
FIG. 9 is a schematic view showing messages used in the fourth embodiment of the present invention.

FIG. 9 is a schematic view showing an E-mail message 900 used in the fourth embodiment. The E-mail message 900 is converted into a message 901 processible in the message store and forward apparatus 100.

The E-mail message 900, containing an order, is entered into the above-described message store and forward apparatus 100. The message store and forward apparatus 100 executes this order in the following manner.

In the same manner as in the third embodiment, the message registration unit 101 cancels the ordinary registration processing when the received message 901 is addressed to "system" who is a special user. Instead, the content of message 901 is forwarded to the processing procedure execution unit 103 to interpret and execute it.

It is now assumed that the E-mail message 900 is sent from the user 1 to the message store and forward apparatus 100. First, the message format conversion unit 104 converts the E-mail message 900 into the message 901. Next, as the converted message 901 is addressed to the special user "system", the message registration unit 101 cancels the registration for the message 901. Instead, the content of this message 901 is regarded as a program and forwarded to the processing procedure execution unit 103.

As a result, the order described in the message 901 is executed. Detailed content of message 901 is "send the message of box 1 to the facsimile 03-123-4567." Thus, all content of box 1 is finally output from the facsimile terminal 114.

As described above, the message registration unit 101 of the fourth embodiment forwards the message, when addressed to the special user (e.g., system), to the processing procedure execution unit 103 to interpret and execute it. This makes it possible to utilize the functions of massage store and forward apparatus 100 from an external information terminal.

Fifth Embodiment

A fifth embodiment of the present invention will be explained with reference to FIGS. 1, 5 and 10. Explanation for FIGS. 1 and 5 is omitted here since it is substantially described in the first embodiment.

Figure 10:
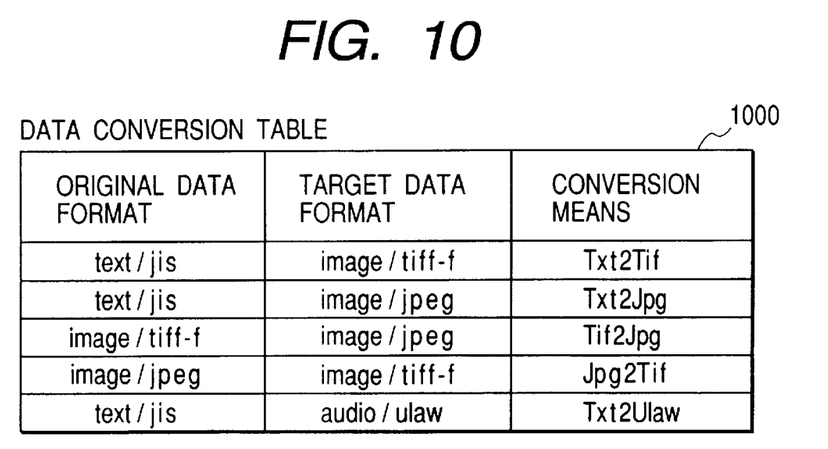
FIG. 10 is a schematic view showing a data conversion table used in the sixth embodiment of the present invention.

FIG. 10 is a schematic view showing a data conversion table 1000 used in the fifth embodiment. The data conversion table 1000 lists up combinations of "original format, target format, and conversion means" that are required when a given data format is converted into an intended target data format by using a conversion means.

The message format conversion unit 104 comprises all of the conversion means listed in this data conversion table 1000.

An operation of the fifth embodiment will be explained hereinafter. It is now assumed that the first box 107 stores the message 501. The data format for the content of message 501 is "text/jis" serving as E-mail origin, i.e. a text expressed by JIS codes.

Then, it is further assumed that the user 1 sends a request via the facsimile terminal 114 to fetch the message 501 from the message store and forward apparatus 100. As the message 501 is a text, the message 501 cannot be sent out directly to the facsimile terminal 114.

Thus, the message fetch unit 102 of the message store and forward apparatus 100 provides the user 1 with voice guidance, such as "Please select your favorite data format. Enter 1 for TIFF or 2 for voice" to encourage the user to enter DTMF signals. In this case, the user 1 who likes TIFF pushes a button 1.

From this entering operation, it is understood that the original data are "text/jis" while the target data are "image/ tiff-f." Thus, the message format conversion unit 104 obtains a suitable conversion means "Txt2Tif" by retrieving the data conversion table 1000 in accordance with the instruction sent from the message fetch unit 102.

The message 501 is then converted into the image of TIFF that has a data format processible in the facsimile server 110 and the facsimile terminal 114. Thus, the message 501 is finally output from the facsimile terminal 114.

As described above, the fifth embodiment makes it possible to designate the data format the user likes in the message fetch operation. In other words, whatever messages stored in the boxes of the message store and forward apparatus 100 can be output to the user's information terminal by converting the data format into an appropriate format.

Sixth Embodiment

A sixth embodiment of the present invention will be explained with reference to FIGS. 1, 5, 10 and 11. Explanation for FIGS. 1, 5 and 10 is omitted here since it is substantially described in the fifth embodiment.

Figure 11:
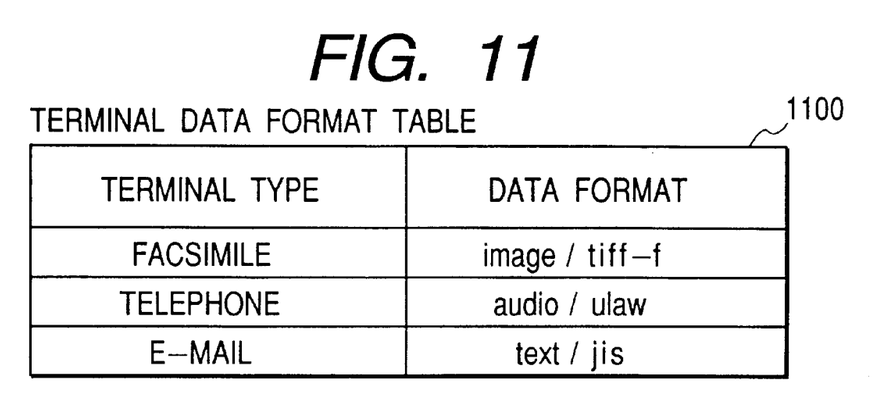
FIG. 11 is a schematic view showing a terminal data format table used in the sixth embodiment of the present invention.

FIG. 11 is a schematic view showing a terminal data format table 1100 used in the sixth embodiment. The terminal data format table 1100 lists up data formats processible or effective in each of various terminals.

As described above, the message format conversion unit 104 comprises all of the conversion means listed in the data conversion table 1000.

An operation of the sixth embodiment will be explained hereinafter. It is now assumed that the first box 107 stores the message 501. The data format for the content of message 501 is "text/jis" serving as E-mail origin, i.e. a text expressed by JIS codes (ISO-2022-JP).

Then, it is further assumed that the user 1 sends a request via the facsimile terminal 114 to fetch the message 501 from the message store and forward apparatus 100. As the message 501 is a text, the message 501 cannot be sent out directly to the facsimile terminal 114.

Thus, the message fetch unit 102 of the message store and forward apparatus 100 provides the user 1 with voice guidance, such as "Please select your terminal. Enter 1 for facsimile or 2 for telephone" to encourage the user to enter DTMF signals. In this case, the user 1 who likes facsimile pushes the button 1.

From this entering operation, it is understood that the processible data format is "image/tiff-f" from the terminal data format table 1100. Accordingly, the original data are "text/jis" while the target data are "image/tiff-f" Thus, the message format conversion unit 104 obtains a suitable conversion means "Txt2Tif" by retrieving the data conversion table 1000 in accordance with the instruction sent from the message fetch unit 102.

The message 501 is then converted into the image of TIFF that has a data format processible in the facsimile server 110 and the facsimile terminal 114. Thus, the message 501 is finally output from the facsimile terminal 114.

As described above, the sixth embodiment makes it possible to designate the information terminal the user likes in the message fetch operation. In other words, whatever messages stored in the boxes of the message store and forward apparatus 100 can be output to the user's information terminal by converting the data format into an appropriate format.

Seventh Embodiment

A seventh embodiment of the present invention will be explained with reference to FIGS. 1, 5 and 12. Explanation for FIGS. 1 and 5 is omitted here since it is substantially described in the first embodiment.

Figure 12:
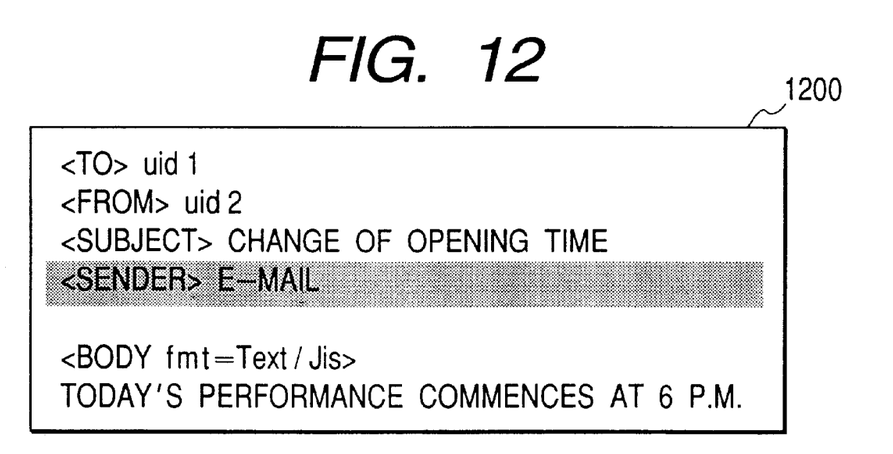
FIG. 12 is a schematic view showing a message used in the seventh embodiment of the present invention.

FIG. 12 is a schematic view showing a resultant message 1200 obtained in accordance with the seventh embodiment when the message format conversion unit 104 converts the E-mail message 500 into a data format processing in the message store and forward apparatus 100.

The seventh embodiment memorizes the type of the terminal used in the message registration operation. When the notice relating to the registered message is sent later to the sender, the notice is exclusively sent via a terminal identical in type with the memorized terminal.

First, it is assumed that the user 2 sends the E-mail message 500 to the user 1. The message format conversion unit 104 converts the E-mail message 500 into the message 1200. The message 1200 differs from the message 501 of the first embodiment by a shadowed portion describing "<Sender> E-mail." This is a field indicating what terminal is used to send the message. For example, when the message is registered from the facsimile terminal 114, the shadowed portion is changed to "<Sender> facsimile."

The message 1200 is stored in the first box 107. Then, it is further assumed that the user 1 has fetched the message 1200 later. In response to this fetch operation, "fetch notice" is sent to the user 2. To this end, the user information table 400 is referred to. The user 2 has three kinds of different message transmitting means of E-mail facsimile and pager. In this case, E-mail "user2@abc" is selected because the sender's terminal type of message 1200 is E-mail. Thus, the fetch notice is sent to this address.

The seventh embodiment is flexibly modified so as to allow the users to designate the memorized information terminal in accordance with their preferences or to predetermine a default terminal as a frequently used terminal on the user information table.

As described above, the seventh embodiment memorizes a related information terminal in connection with each registered message. This makes it possible to select an appropriate one of a plurality of transmitting devices when a notice relating to this message is sent later.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A message store and forward apparatus comprising:
    message storage means for storing a message, said message storage means comprising a program region storing programs for executing predetermined preprocessing and/or postprocessing;
    message processing means for processing the message for said message storage means; and
    processing procedure execution means for interpreting and executing said predetermined preprocessing and/or postprocessing in such a manner that said preprocessing is executed before said message processing means starts the processing of said message and said postprocessing is executed after said message processing means has finished the processing of said message,
    said preprocessing procedure execution means further flexibly renewing said programs for executing said preprocessing and/or postprocessing according to a user.

2. The message store and forward apparatus in accordance with claim 1, wherein said programs for executing said preprocessing and/or postprocessing are editable by sending an edit message to said processing procedure execution means, said edit message including content of an editing operation according to the user's preference.

3. A message store and forward apparatus comprising:

a plurality of boxes serving as a memory means for storing messages, each box comprising a program region storing programs for executing predetermined preprocessing and postprocessing;

message registration means for registering the message into a designated one of said plurality of boxes; and processing procedure execution means for executing said predetermined preprocessing before said message registration means starts the registration of said message, and for executing said predetermined postprocessing after said message registration means has finished the registration of said message, said processing procedure execution means further flexibly changing content of said programs for executing said preprocessing and/or postprocessing for each box according to a user.

4. A message store and forward apparatus comprising:

a plurality of boxes serving as a memory means for storing messages, each box comprising a program region storing programs for executing predetermined preprocessing and postprocessing;

message fetch means for fetching the message from a designated one of said plurality of boxes; and processing procedure execution means for executing said predetermined preprocessing before said message fetch means starts the fetching of said message, and for executing said predetermined postprocessing after said message fetch means has finished the fetching of said message, said processing procedure execution means further flexibly renewing content of said programs for executing said preprocessing and/or postprocessing for each box according to a user.

* * * * *